Patented June 19, 1934

1,963,315

UNITED STATES PATENT OFFICE 1,963,315

PRODUCTION OF IRON OR STEEL

MacGilvray Shiras, Pittsburgh, Pa.

No Drawing. Application June 22, 1933,
Serial No. 677,166

2 Claims. (Cl. 75—48)

Natural high grade lump iron ore of such analysis, density, weight and lumpy character as to meet requirements in the manufacture of open hearth steel is relatively scarce and expensive. It is used as an oxidizer in the open hearth process and is commonly known as "fix" ore.

This invention aims to provide an economical substitute which can be used in open hearth steel practice. It is made from iron oxide in finely divided condition such, for example, as iron and steel roll scale, ore and blast furnace flue dust.

The material is charged into a furnace having the bottom and sides lined with a low silica refractory such as magnesite, chrome oxide, dolomite, iron oxide and the like. The furnace may be of any type such, for example, as steel reheating furnaces or open hearth furnaces and may be fired with gas, oil, tar, coal dust, coke dust or other fuel.

The charge is preferably placed mostly on the ends and end walls of the furnace and is subjected to such heat that the materials melt and flow to the center of the furnace where they collect in a molten slag-like mass which is tapped and run in liquid form into suitable casting boxes for a container. Upon cooling it solidifies in the form of dense, heavy, lumpy masses admirably suited in every way as a substitute for high grade lump iron ore usable as "fix" ore in open hearth steel practice. I have found by experiments on a large scale that the process is practicable for the conversion of large tonnages of the more or less finely divided material into the heavy, lumpy form having the required analysis of "fix" ore. Natural lump ore of the required analysis and physical character can be replaced largely by the product of this invention, with substantial economy.

By charging the material to be treated on the ends and end walls of the furnace, as stated above, the molten material is permitted to run toward the center of the furnace and gather in a pool has material practical value in that it facilitates melting of the mass and the additions of roll scale from time to time, thereby reducing the time required to melt the charge materially and reducing the amount of fuel consumed.

It is practicable, and in some cases preferable, to add to the molten material as it flows from the furnace some additional roll scale or ore in its natural state. These additions may be added to the extent that such additions can be entrained by the molten material before solidifying. The additions of the roll scale or ore to the molten material reduces the expense of melting such additions and does not in any way reduce the value of the resultant product.

The product resulting from this invention is particularly adapted for use in steel open hearth practice, but it may find use in other iron and steel producing operations. The purpose in making additions of this material in open hearth practice is to supply the metal bath with a regulated amount of oxygen in order to effect the desired reduction in carbon or metalloids in the molten steel. The material of this invention is in such lumpy and heavy form that it will readily penetrate the blanket of basic open hearth slag and impinge directly on the bath of molten metal where its effect is immediately imparted to the molten steel of the open hearth. Low silica in the material of this invention is particularly desired so that the basicity of the basic open hearth slag will not be substantially lessened.

While I have disclosed a specific embodiment of my invention which has been used on a large scale by me and is the best known embodiment at this time, I do not wish to be limited to the details thereof, since various modifications may be developed by those skilled in the art without departing from the scope of my invention as defined in the appended claims.

I claim:

1. The hereindescribed process which consists in charging iron or steel scale, iron ore, blast furnace flue dust or other oxides of iron in finely divided condition into a furnace with a low silica lining, melting the charge therein, and casting the molten product into dense, heavy, lumpy masses of iron oxide low in silica and adapted for use as a substitute for "fix" ore in open hearth practice, and adding similar finely divided solid material to the molten mass as it flows from the furnace.

2. The hereindescribed product consisting of finely divided iron oxides melted down and cast in dense, heavy, lumpy masses low in silica, and adapted for use as a substitute for "fix" ore in open hearth steel practice, and similar material in granular form carried by the denser material.

MacGILVRAY SHIRAS.